(12) United States Patent
Conner

(10) Patent No.: US 6,258,226 B1
(45) Date of Patent: Jul. 10, 2001

(54) DEVICE FOR PREVENTING PLATING OF MATERIAL IN SURFACE OPENINGS OF TURBINE AIRFOILS

(75) Inventor: Jeffrey A. Conner, Hamilton, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/370,752

(22) Filed: Aug. 9, 1999

Related U.S. Application Data

(62) Division of application No. 08/938,694, filed on Sep. 26, 1997, now Pat. No. 5,985,122.

(51) Int. Cl.$^7$ .................................................. C25D 5/02
(52) U.S. Cl. ..................................... 204/279; 204/297.05
(58) Field of Search .............................. 204/297.05, 279; 205/135, 136, 122; 118/505

(56) References Cited

U.S. PATENT DOCUMENTS

| | | | |
|---|---|---|---|
| 2,792,007 | * 5/1957 | Parmer | 132/162 |
| 4,396,503 | 8/1983 | Schmidt | 209/393 |
| 4,501,776 | 2/1985 | Shankar | 427/253 |
| 4,530,861 | * 7/1985 | Sippel et al. | 427/444 |
| 4,743,462 | 5/1988 | Radzavich et al. | 427/34 |
| 5,108,552 | 4/1992 | Desthomas | 205/82 |
| 5,374,345 | * 12/1994 | Owada | 205/118 |
| 5,565,035 | * 10/1996 | Sylvestro et al. | 118/721 |
| 5,800,695 | 9/1998 | Kang et al. | 205/135 |

* cited by examiner

Primary Examiner—Kathryn Gorgos
Assistant Examiner—William T. Leader
(74) Attorney, Agent, or Firm—Andrew C. Hess; David L. Narciso

(57) ABSTRACT

A method for preventing the deposition of material in an opening near a surface of an article, and a masking insert therefore. The method and insert are particularly suited for preventing the plating of a metal, such as platinum, on turbine airfoils or turbine blades and vanes having a complex geometry, as is the case when cast trailing edge cooling slots are present in the airfoil surface. The method entails the use of the masking insert, which is precisely configured to mask the cooling slots during plating by preventing circulation of the plating bath through the slots. For this purpose, the insert is equipped with appendages that are sized, shaped, spaced and oriented on a base member to register with, and preferably be received within, the cooling slots of an airfoil having a particular cooling slot design.

9 Claims, 1 Drawing Sheet

DEVICE FOR PREVENTING PLATING OF MATERIAL IN SURFACE OPENINGS OF TURBINE AIRFOILS

This is a division of patent application Ser. No. 08/938,694, filed Sept. 26, 1997, now U.S. Pat. No. 5,985,122.

FIELD OF THE INVENTION

The present invention relates to material deposition processes. More particularly, this invention relates to a process for selectively plating a component that will be subjected to high temperatures, and a masking device therefor.

BACKGROUND OF THE INVENTION

Airfoils of turbine blades and vanes (nozzles) of a gas turbine engine often require a complex cooling scheme in which cooling air flows through the airfoil and is then discharged through carefully configured cooling holes, for example, cooling slots at the trailing edge of the airfoil. The performance of a turbine blade is directly related to the ability to provide uniform cooling of its airfoil surfaces. Consequently, the control of cooling hole size and shape is critical in many turbine airfoil designs because the size and shape of the opening determine the amount of flow exiting a given opening, its distribution across the surface of the airfoil, and the overall flow distribution within the cooling circuit containing the openings. Other factors, such as backflow margin, are also affected by variations in opening size. In addition to conventional hole drilling techniques such as laser machining and electrical-discharge machining (EDM), complex advanced casting practices are typically used to yield airfoil castings with dimensionally correct openings in order to repeatably control opening size. Once cast, subsequent airfoil manufacturing operations must be performed such that cast-to-size openings are not processed through any operations that would significantly alter the dimensions of some or all of the openings.

Due to the severity of the operating environment of turbine airfoils, environmentally protective coatings are typically applied to these components when manufactured and also during repair. Platinum aluminide coatings are widely used to protect airfoils for this reason. Such coatings are produced by a multi-step process that includes plating platinum on surfaces requiring a protective coating, and then subsequently aluminizing the platinum plated surfaces by known methods such as pack cementation and noncontact vapor (gas phase deposition) techniques. As is apparent from the above, an environmental coating must not prevent the airfoil from meeting numerous operational requirements, including airflow requirements for the cooling air required to flow through the airfoil and exit through cooling holes and slots at the airfoil surface.

Current state of the art platinum plating baths deposit platinum on airfoils via electroplating, in which the airfoil serves as the cathode in the plating process. As a result of the unstable nature of precious metal-containing plating baths and the complex geometries of airfoils, plated material and/or precipitated material can accumulate in the surface openings of an airfoil, such as cast trailing edge slots and EDM diffusers of an air-cooled airfoil. Once present in the slots, these precious metal deposits can impact airflow by blistering, peeling, flaking or bridging inside the slot, or by increasing the effective platinum aluminide coating thickness in local areas or in the slot as a whole. These platinum-related perturbations act as flow restrictors for the slot, adversely impacting airflow and flow distribution through the airfoil. An airfoil with this condition is subject to rejection at the manufacturing level due to nonconforming air flow or, if in service, localized surface hot spots. Additionally, poor adhesion of the plating material can occur as a result of insufficient surface preparation of the substrate material in the slots, leading to subsequent spalling of the plating and coating during engine operation. Coating loss of this type changes the in-service flow distribution along the airfoil trailing edge, resulting in unpredicted airfoil distress.

In view of the above, various methods have been employed for preventing the deposition of platinum in the cooling holes of turbine airfoils. In addition to minimizing the change in cooling hole size and shape resulting from the plating operation, an additional benefit of preventing plating in the cooling holes is that the amount of platinum consumed by the plating operation is reduced. Generally, previous methods have involved mechanical masking, lacquering, taping and/or waxing, each of which is a conventional technique employed in the plating art for preventing the plating of specific surfaces on an article. However, each of these techniques has drawbacks when attempting to prevent plating in a surface opening. For example, mechanical masking and taping methods are generally limited to being suitable for large areas with generous transition zones between areas requiring plating and those that do not. Consequently, isolated small areas and/or exact areas where transitions between plated and unplated regions are critical do not lend themselves to mechanical masking or taping.

While lacquering can be effective for a wide range of uses, application is labor intensive. In addition, lacquer residues on adjacent surfaces can create plating defects, and additional manufacturing steps, such as ultrasonic cleaning and furnace burnout cycles, are required to remove lacquer after the plating operation. Ultrasonic cleaning techniques typically entail the use of ozone-depleting chemicals, and therefore are preferably avoided. Finally, while wax can be used to mask both external and internal surfaces during plating, methods by which wax is applied are imprecise and have been demonstrated to result in increased plating defects as a result of hydrocarbon contamination of the plating bath. As with lacquer, wax residues can be inadvertently left on surfaces that are intended for plating, causing the surfaces to be unplated or nonuniformly plated. Finally, after plating, components masked with wax must be processed through wax melting, ultrasonic cleaning and burnout cycles, at minimum, to remove all traces of wax from the component prior to subsequent processing.

Another drawback of lacquer and wax masking techniques is that, in order to control the thickness of the plating on an airfoil, the airfoil must typically be removed several times from the bath and weighed, providing an indication of the thickness of the platinum deposited. Once an airfoil is filled with lacquer or wax, the weight of the lacquer or wax must be accounted for when calculating the adequacy of the plating. However, loss of wax or lacquer during plating and plating solution trapped in the airfoil by the masking material inherently leads to false measurements and unintended plating thicknesses.

In view of the above, it can be seen that conventional masking techniques do not provide for a cost-effective, repeatable masking method for plating airfoils with detailed surface features on which plating is to be avoided. Accordingly, it would be desirable if an improved method were available for selectively plating an airfoil, and if such a method could prevent the deposition of material in the cooling holes and slots near the surface of an airfoil.

SUMMARY OF THE INVENTION

According to the present invention, there is provided a method for preventing the deposition of material on a surface, and particularly for preventing the plating of platinum or another metal on a turbine airfoil having a complex geometry, as is the particular case when surface openings such as cast trailing edge cooling slots are present. The method entails the use of a masking insert that is precisely configured to mask the openings during plating by preventing circulation of the plating bath through the openings. For this purpose, the insert is equipped with appendages that are sized, shaped, spaced and oriented on a base member to register with, and preferably be received within, the cooling holes and slots of an airfoil having a particular cooling slot design.

The method of this invention generally entails mounting the masking insert on the airfoil by registering the appendages of the masking insert with at least some, and preferably all, of the surface openings in the airfoil. The airfoil is then immersed in a plating bath, followed by plating a material on the airfoil. As indicated above, the masking insert substantially prevents circulation of the bath in the surface openings registered with the appendages, thereby preventing the plating of the walls of the openings. Afterwards, the airfoil is removed from the bath, and the masking insert is removed from the airfoil.

According to the above, the present invention provides a simplified method for masking the surface cooling holes and slots of a turbine airfoil, thereby minimizing the change in cooling hole size and shape attributable to the plating operation and reducing the amount of plating metal used. For example, the method eliminates the intense labor required to deposit and remove lacquer and wax masks, and does not lead to contamination of the plating bath. Furthermore, the method is more precisely able to selectively mask the cooling slots by blocking each slot with its corresponding masking insert appendage. As a result, the plating bath is prevented from circulating through the airfoil, and plating is prevented or at least substantially inhibited from occurring on the walls of the cooling slots, such that the as-cast dimensions of the cooling slots are maintained immediately after the plating operation. Notably, while subsequent aluminizing of the plated surface and unplated cooling slots will alter the dimensions of the cooling slots, the thickness of the aluminide coating is very uniform and predictable, contrary to the platinum plating whose thickness in the cooling slots would be nonuniform, unpredictable and uncontrollable. As such, the desired thickness for the aluminide coating can be readily taken into account when the airfoil is cast by appropriately oversizing the cooling slots.

From the above, it can be seen that a notable advantage of the present invention is its uncomplicated processing and equipment requirements. Prior art mechanical, lacquer and wax masking techniques have generally relied on altogether preventing a plating bath from contacting any surface not to be plated, necessitating complex tooling and/or application and removal techniques. In contrast, the present invention relies on the use of a masking insert that has been determined to perform well by preventing the circulation of a plating bath through the cooling holes, instead of masking the entire cooling circuit. As a result, both the equipment and masking technique afforded by the masking insert of this invention are considerably less complicated than that associated with prior art masking methods, yet achieves the object of preventing plating in the cooling holes.

Other objects and advantages of this invention will be better appreciated from the following detailed description.

DETAILED DESCRIPTION OF THE INVENTION

Figure 2:
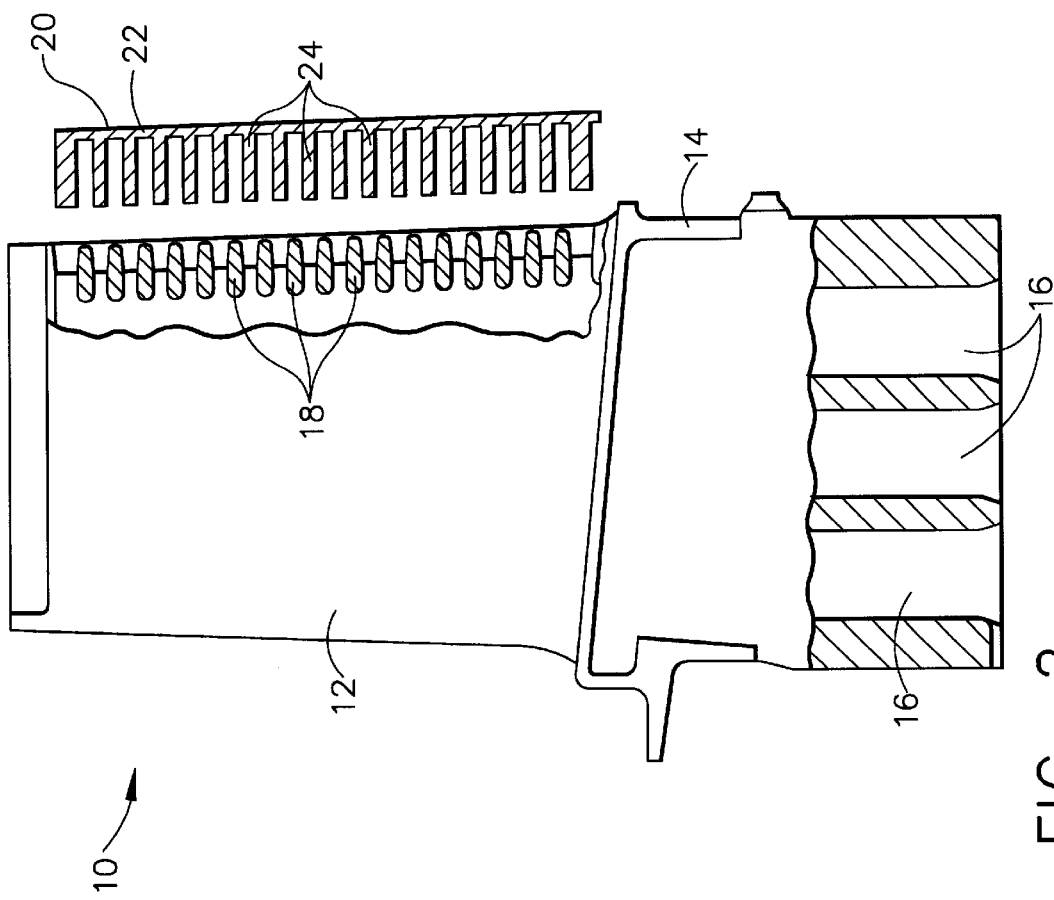
FIG. 2 shows the airfoil of FIG. 1 in partial cross-section and a masking insert for preventing electrodeposition of material in the trailing edge cooling slots in accordance with this invention.
Figure 1:
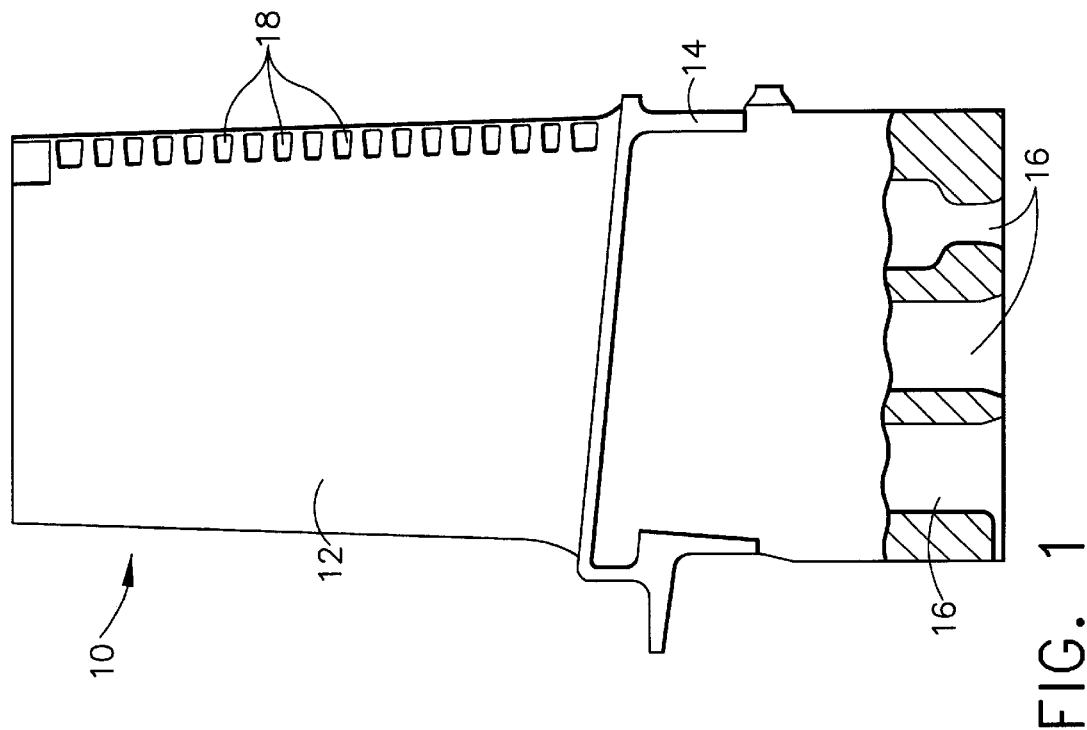
FIG. 1 is a side view of a turbine airfoil having cast trailing edge cooling slots.

The present invention provides a method for preventing the deposition of a material in the surface openings of an article, such as a gas turbine engine turbine blade 10 represented in FIGS. 1 and 2. While the advantages of this invention will be illustrated and described with reference to a gas turbine engine component on which an environmental coating is to be deposited to protect the component from a hostile environment, the teachings of this invention are generally applicable to any component having surface openings and on which a material is to be deposited with the exception of the surface openings.

As is generally conventional, the blade 10 shown in the Figures may be formed of an iron-, nickel- or cobalt-base superalloy. The blade 10 includes an airfoil section 12 against which hot combustion gases are directed during operation of the gas turbine engine, and whose surface is therefore subjected to severe attack by oxidation, corrosion and erosion. The airfoil section 12 is anchored to a turbine disk (not shown) through a root section 14. Cooling passages 16 visible in the root section 14 extend through the airfoil section 12, and terminate at a number of trailing edge cooling slots 18. Bleed air is forced through the cooling passages 16 and is discharged from the cooling slots 18 in order to transfer heat from the blade 10. While cast trailing edge cooling slots 18 are represented in the Figures, the invention is applicable to other surface feature, such as diffuser holes formed in airfoils by EDM.

According to this invention, the airfoil section 12 is to be protected from the hostile environment of the turbine section by an environmentally-resistant platinum aluminide coating. As is understood in the art, such a coating is a type of aluminide coating in which platinum is incorporated by electroplating a layer of platinum on the substrate, followed by aluminizing the platinum plating by such processes as pack cementation or noncontact vapor (gas phase deposition) techniques. Two distinct zones are typically formed, an outermost of which is an additive layer that contains the environmentally-resistant intermetallic phase MAl, where M is iron, nickel or cobalt, depending on the substrate material. Beneath the additive layer is a diffusion zone comprised of various intermetallic and metastable phases that form during the coating reaction as a result of diffusional gradients and changes in elemental solubility in the local region of the substrate. During high temperature exposure in air, the MAl intermetallic forms a protective aluminum oxide (alumina) scale that inhibits oxidation of the diffusion coating and the underlying substrate.

Because platinum is first deposited onto the substrate prior to aluminizing, the additive layer further includes PtAl intermetallic phases, usually $PtAl_2$ or platinum in solution in the beta NiAl phase. The coating is preferably deposited on the superalloy substrate of the airfoil 12 to a thickness of about five to about ten micrometers, though greater and lesser thicknesses are foreseeable. While platinum-aluminide coatings are the focus of the following discussion, the plating of other materials is also within the scope of this invention, including palladium and rhodium which are also used to form environmental coatings on the surfaces of airfoils.

In order to prevent electrodeposition of platinum on the surfaces of the cooling slots 18, the present invention provides a masking insert 20 shown in FIG. 2. The masking insert 20 is composed of a base 22 from which a number of appendages 24 extend. While the appendages 24 are illustrated as being aligned in a single straight row on the base 22, the appendages 24 could be arranged in nonlinear rows and various other patterns, depending on the configuration of the airfoil 12 and the location of the cooling slots 18 in the airfoil 12. As is apparent from FIG. 2, the masking insert 20 is uniquely configured for use with the blade 10, in that the appendages 24 are shaped, sized, spaced and oriented to register with the cooling slots 18. As such, the insert 20 can be mounted and secured to the trailing edge of the blade 10 by inserting the appendages 24 in their respective slots 18. According to the invention, the appendages 24 are sized and shaped so that each will closely mate with the wall of its corresponding slot 18. In so doing, the appendages 24 exclude plating bath from the slots 18 and prevent plating bath from circulating through the cooling passages 16 and slots 18, which would otherwise occur during the plating operation. Without bath circulation, platinum is significantly deterred from plating out onto the walls of the slots 18.

For use in conventional platinum electroplating baths, the masking insert 20 is preferably formed of a material that is electrically non-conducting so that plating does not occur on its surfaces. Suitable known materials for this purpose include plastics able to withstand the plating bath temperatures, though it is foreseeable that other materials, including conductive materials, could be used. While various methods could be employed to form the insert 20, including stamping, forming and machining, the insert 20 is preferably fabricated using a dimensionally accurate mold that is complementary to the core die for the blade 10. As such, minimal capital outlay is necessary to produce the insert 20 with appendages 24 whose size, shape, spacing and orientation are customized for the particular blade 10 to be plated.

With the insert 20, plating of the blade 10 entails mounting the insert 20 to the blade 10 by inserting the appendages 24 in their respective slots 18. The airfoil 12 and insert 20 assembly can then be immersed in a suitable plating bath, by which platinum is plated onto the surface of the airfoil 12 as a first step in forming a platinum aluminide environmental coating. Because the appendages 24 are specially shaped and sized to closely fit within their respective slots 18, fixtures are not required to secure the insert 20 to the blade 10. In addition, the fit between each slot 18 and its corresponding appendage 24 is sufficient to prevent the plating bath circulation through the slot 18, such that platinum plating of the walls of the slots 18 is dramatically reduced.

In order to control the thickness of the plating on the airfoil 12, the airfoil 12 and insert 20 may be removed from the bath and the insert 20 removed from the airfoil 12 to allow the airfoil 12 to be weighed, providing an indication of the thickness of the platinum deposited. Because the insert 20 can be easily and repeatedly mounted and removed from the airfoil 12 without degradation, weight loss or gain, or otherwise leading to inaccurate estimates of the weight gain of the plated airfoil 12, the thickness of the plating can be accurately obtained. Once the desired plating thickness is produced on the airfoil 12, the blade 10 and insert 20 assembly is removed from the bath, and the insert 20 removed from the blade 10. Contrary to prior art masking methods, no additional operations are required to remove masking residues or prepare the blade 10 for subsequent coating processes.

While the invention has been described in terms of a preferred embodiment, it is apparent that other forms could be adopted by one skilled in the art. For example, the physical configuration of the blade 10 and insert 20 could vary considerably, and the insert 20 could be used in plating operations that differ from that noted here. Therefore, the scope of the invention is to be limited only by the following claims.

What is claimed is:

1. An electroplating masking insert assembled with an airfoil having surface openings therein, the masking insert comprising a base and appendages projecting from the base, at least some of the appendages being positioned and oriented on the base so as to be simultaneously received in at least some of the surface openings in the airfoil, the appendages blocking the surface openings in which they are received.

2. An electroplating masking insert assembled with an airfoil as recited in claim 1, wherein the masking insert is formed of an electrically-nonconducting material.

3. An electroplating masking insert assembled with an airfoil as recited in claim 1, wherein the appendages are arranged in a row on the base and extend substantially parallel to each other from the base.

4. An electroplating masking insert assembled with an airfoil as recited in claim 1, wherein each surface opening in the airfoil is defined by a wall, and wherein the appendages contact only the walls of each of the surface openings.

5. An electroplating masking insert assembled with an airfoil as recited in claim 1, wherein the appendages provide a substantially fluid-tight seal within the at least some of the surface openings.

6. An electroplating masking insert assembled with an airfoil as recited in claim 1, wherein each of the appendages is received in a corresponding one of the surface openings in the airfoil, such that all of the surface openings are blocked by the appendages.

7. An electroplating masking insert assembled with an airfoil as recited in claim 6, wherein the surface openings of the airfoil are cooling holes in communication with a cooling passage within the airfoil, and wherein the cooling passage is not blocked by any of the appendages.

8. An electroplating masking insert assembled with a turbine blade having an airfoil section, a cooling passage within the airfoil section, and cooling holes in a surface thereof and in communication with the cooling passage, the masking insert comprising a base and appendages projecting from the base, each of the appendages being received in a corresponding one of the cooling holes so that each cooling hole is blocked.

9. An electroplating masking insert assembled with a turbine blade as recited in claim 8, wherein the cooling passage is not blocked by any of the appendages.

* * * * *